Figure 1:
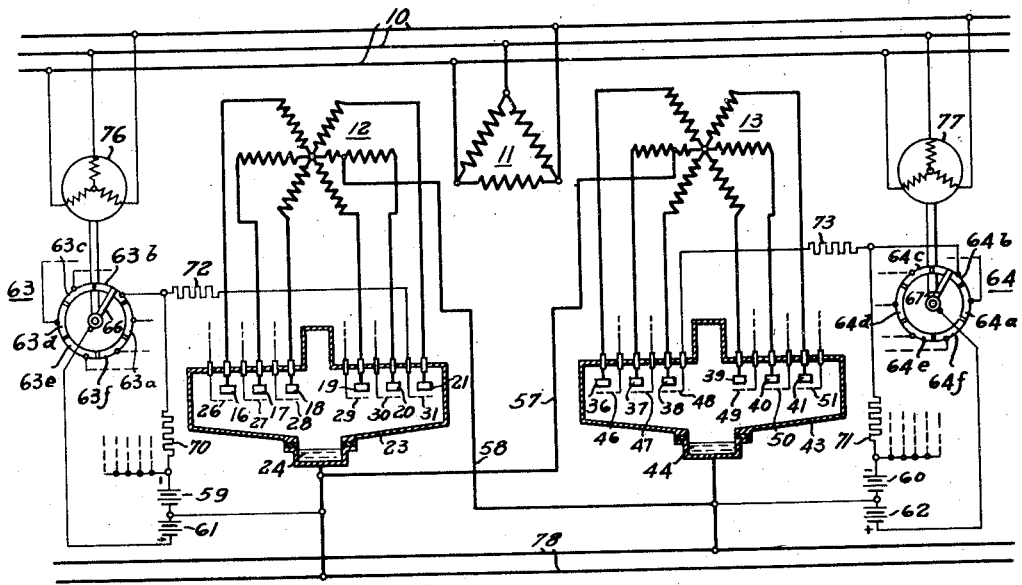

June 6, 1933. H. MEYER-DELIUS 1,913,338

FREQUENCY CHANGING SYSTEM

Filed Jan. 12, 1933 3 Sheets-Sheet 1

June 6, 1933.  H. MEYER-DELIUS  1,913,338
FREQUENCY CHANGING SYSTEM
Filed Jan. 12, 1933   3 Sheets-Sheet 3

Inventor
H. Meyer-Delius
by G. P. Delwin
Attorney

Patented June 6, 1933

1,913,338

UNITED STATES PATENT OFFICE

HEINRICH MEYER-DELIUS, OF HEIDELBERG-SCHLIERBACH, GERMANY, ASSIGNOR TO AKTIENGESELLSCHAFT BROWN, BOVERI & CIE., OF BADEN, SWITZERLAND, A JOINT STOCK COMPANY OF SWITZERLAND

FREQUENCY CHANGING SYSTEM

Application filed January 12, 1933, Serial No. 651,277, and in Germany January 2, 1932.

This invention relates to improvements in systems for converting current at one frequency from an alternating current input line into current at a different frequency which is desired in an alternating current output line, by the use of electron discharge devices, and more particularly to means for supplying the output line with current at a voltage of substantially sinusoidal wave shape.

When alternating current of one frequency is converted into alternating current of another frequency by means of electron discharge devices operable as alternating current rectifiers, two such rectifiers or two separate sets of anodes of a single rectifier structure must be provided to operate alternately during each half cycle of the alternating current voltage in the output line. Such operation is obtained by the controlling action of suitable control electrodes on the operation of the anodes of the rectifier or rectifiers. The voltage of the output line thus obtained has a wave shape which differs materially from the sine wave shape unless additional means are provided to correct such wave shape. It has been proposed to utilize means introducing additional voltages into the output line to bring the voltage of such line to the sinusoidal wave shape but such means complicate the system considerably and increase the cost of the system by a large amount. A satisfactory wave shape may also be obtained by providing the input transformer of the system with secondary windings having the several phase portions thereof wound with different numbers of turns so that the several secondary phase voltages of such transformer are different in magnitude. Such constructions is, however, complicated and does not allow utilization of an existing transformer unless the windings of such transformer are entirely rewound. A substantially sine wave shaped output voltage may be obtained in a simpler way, by utilizing an input transformer in which the different secondary winding phase portions have the same number of turns, merely by suitable rearrangement of the connections between such secondary phase winding portions.

It is accordingly one of the objects of the present invention to provide a frequency converting system employing electron discharge devices delivering current at a voltage which is substantially sinusoidal.

Another object of the present invention is to provide a frequency converting system employing electron discharge devices in which the input transformer to such devices is provided with secondary windings each divided into a plurality of phase portions having equal numbers of turns.

Another object of the present invention is to provide a frequency converting system employing electron discharge devices in which the input transformer to such devices is provided with secondary windings connected with the output line at points different from the usual neutral points of such windings.

Objects and advantages, other than those above set forth, will be apparent from the following description when read in connection with the accompanying drawings, in which:

Fig. 1 diagrammatically illustrates one embodiment of the present invention in which two electron discharge devices are supplied with polyphase alternating current at one frequency and deliver single phase alternating current at another frequency equal to one-third of the input frequency, and in which the conductors of the output line are connected with a tap of one of the phase portions of separate secondary windings of the input transformer.

Figure 2:
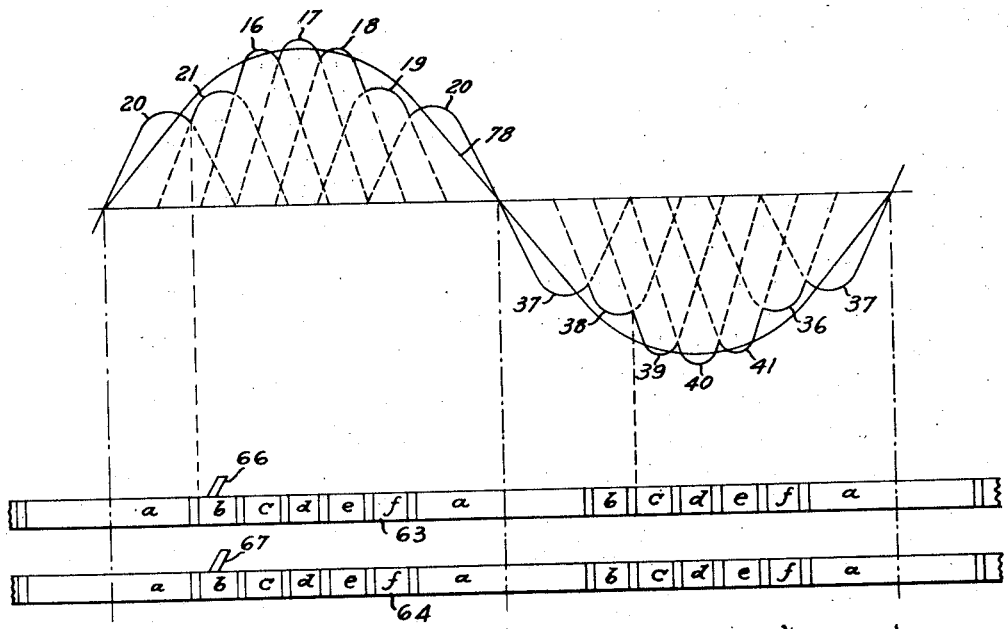

Fig. 2 is a diagram illustrating the voltage relations of the several anodes operating in sequence in the two electron discharge devices utilized in the embodiment illustrated in Fig. 1 and also illustrating the sequence of energization of the control electrodes of such devices.

Figure 3:
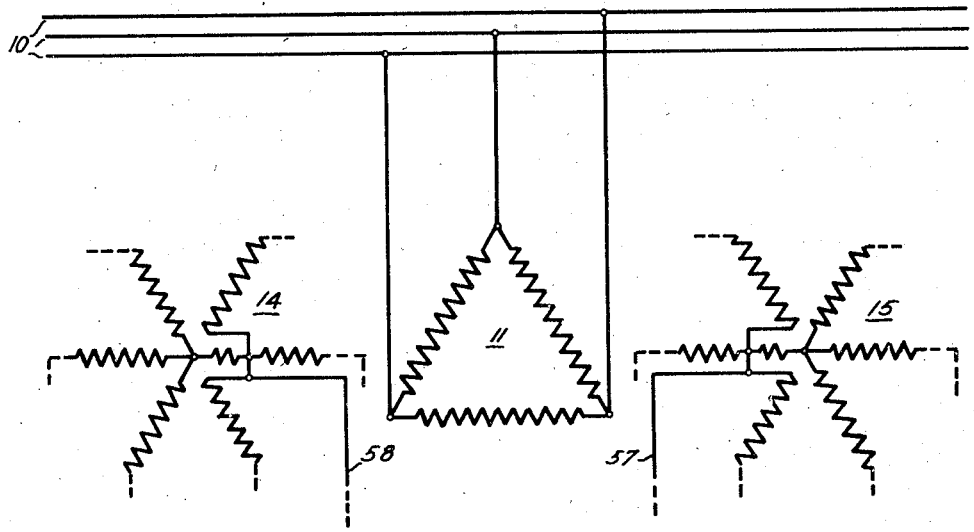

Fig. 3 diagrammatically illustrates a modified embodiment of the present invention differing only from the embodiment illustrated in Fig. 1 in the method of connection of the several secondary winding phase portions of the input transformer and therefore only partially illustrated.

Figure 4:
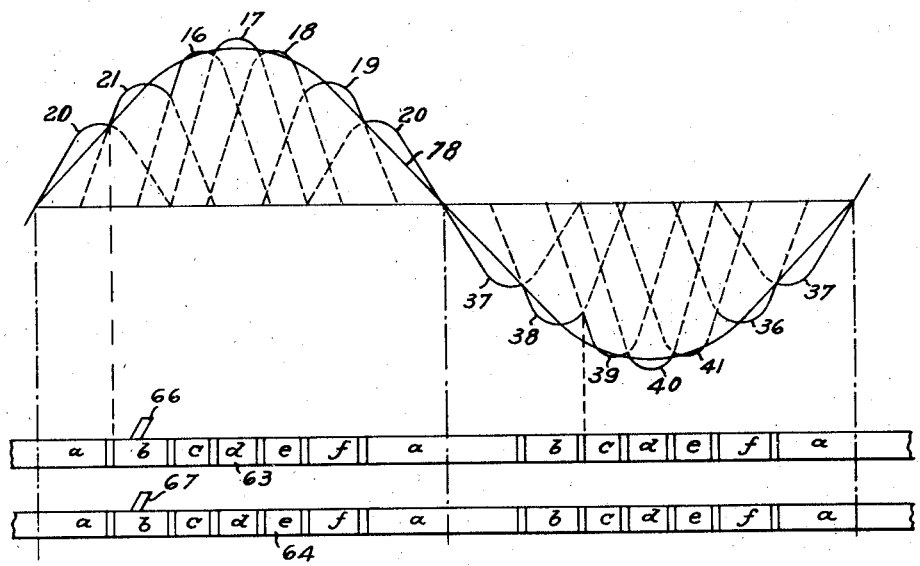

Fig. 4 is a diagram illustrating the voltage relations of the several anodes operating in sequence in the two devices utilized in the embodiment illustrated in Fig. 3 and also illustrating the sequence of energization of the control electrodes of such devices.

Figure 5:
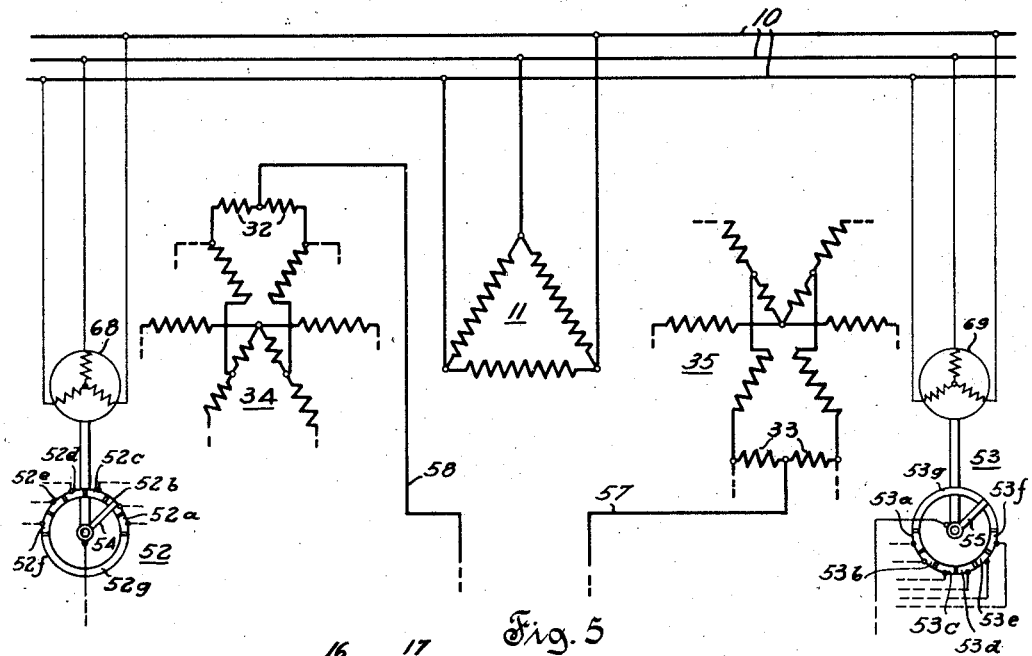

Fig. 5 illustrates a portion of a further modified embodiment of the present invention operable for converting polyphase alternating current of one frequency into single phase alternating current of another frequency equal to one-half the input frequency, and differing from the embodiment illustrated in Fig. 1 only in the method of connection of the several secondary winding phase portions of the input transformer and in the sequence of energization of the control electrodes of the devices and therefore only partially illustrated.

Figure 6:
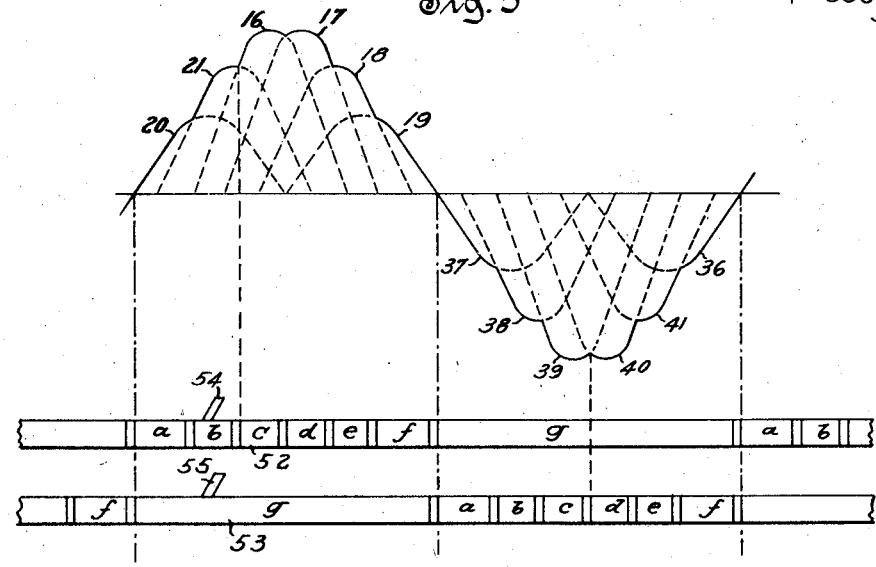

Fig. 6 is a diagram illustrating the voltage relations of the several anodes operating in sequence in the two devices utilized in the embodiment illustrated in Fig. 5 and also illustrating the sequence of energization of the control electrodes of such devices.

Referring more particularly to the drawings by characters of reference, reference numeral 10 designates a polyphase alternating current supply line herein illustrated as a three-phase line for the reason that this type of line is most frequently utilized in practice. Line 10 may be operated at any given frequency such as, for instance, sixty cycles per second. The primary winding 11 of a transformer is connected with line 10 and is arranged in inductive relation with two secondary windings 12 and 13, each divided into a plurality of star connected phase portions. The several portions of winding 12 are connected with anodes 16, 17, 18, 19, 20 and 21 of an electron discharge device generally designated by 23 which device is operable as an alternating current rectifier and is provided with a cathode 24. The anodes of rectifier 23 are provided with control electrodes 26, 27, 28, 29, 30 or 31, respectively, on which potentials may be impressed to control the moment in the cycle of the alternating current supply voltage at which the associated anodes will be operable to start carrying current as will be described hereinafter. The phase portions of winding 13 are similarly connected with anodes 36, 37, 38, 39, 40 and 41 of a second rectifier generally indicated at 43 and provided with a cathode 44. Each of the anodes of rectifier 43 also has associated therewith a control electrode 46, 47, 48, 49, 50 or 51, respectively. Cathode 24 is connected with a tap provided in one of the phase portions of winding 13 by a conductor 57 and cathode 44 is similarly connected with a tap in one of the phase portions of winding 12 by a conductor 58. Such taps are preferably provided in phase winding portions delivering voltages 180° out of phase with respect to each other, each tap being preferably so located on the respective phase winding portion as to be removed from the neutral point of the complete winding by substantially 25% of the turns of the tapped portion. Cathodes 24 and 44 are also severally connected with the conductors of the output line 78 which, in the embodiment of Fig. 1, is assumed to operate at a frequency of twenty cycles per second. It will be understood that each of the rectifiers 23 and 43 is provided with means for striking the arc and for maintaining such arc within each of the rectifiers as is well known in the electric current rectifying art and therefore not shown or described herein.

A negative potential relative to the potential of the cathodes is continuously impressed on each of the control electrodes of both rectifiers from suitable sources connected with the respective cathodes of the rectifiers such as batteries 59 and 60 and through suitable resistances such as 70, 71, 72 and 73. Each control electrode is also sequentially energized at a positive potential with respect to the associated cathode potential from a suitable source such as battery 61 or 62 through a segment of a distributor switch 63 or 64 and the brush 66 or 67 thereof. In the present embodiment, brushes 66 and 67 are respectively driven by synchronous motors 76 and 77 energized from line 10. Motors 76 and 77 are chosen with a suitable number of poles and are provided with suitable gears or other rigid transmission means for operating brushes 66 and 67 to make two revolutions for every cycle of the voltage of line 78, thus energizing each control electrode once during each positive half cycle and once during each negative half cycle of the output line voltage.

To facilitate comprehension of the system above described reference is now made to Fig. 2 representing the relations of the voltages impressed on the different anodes of the rectifiers. Curves 16 to 21 and 36 to 41 respectively represent the half waves of voltage applied on the different anodes designated by the same reference numerals in Fig. 1 and curve 78 represents the sine wave voltage which it is desired to approximate in the output line designated by the same numeral. Fig. 2 also shows a development of the segments of distributors 63 and 64 extending over a period of more than one cycle of the voltage of line 78. A juxtaposition of such developed distributor segments and of the voltage curves of the anodes of the rectifiers shows which segments of the distributors are in contact with the associated brushes at any instant considered as related to points on the time axis of the voltage waves.

Assuming line 10 to be energized, motors 76 and 77 drive brushes 66 and 67 at twice the synchronous speed corresponding to the frequency of line 78. Transformer 11, 12, 13 is energized from line 10 and, assuming that the arc has been struck and is being maintained in each rectifier as is usual, only the anodes of the rectifiers positively energized with respect to the associated cathode may carry current if the associated control electrodes are then positive with respect to the cathode. Considering the operation of rectifier 23, all the control electrodes thereof are generally maintained at a negative potential with respect to the potential of cathode 24 by battery 59. During the positive half cycle of the voltage of line 78, brush 66 comes in contact successively with segments 63a to 63f and returns into contact with segment 63a thereby permitting the positive energization of control electrodes 30, 31, 26, 27, 28, 29 and reenergization of electrode 30, in the sequence named. Such positive energization permits anodes 20, 21, 16, 17, 18, 19 and anode 20 to carry current in the sequence named, the anode carrying current at any instant considered being the anode having the highest positive potential with respect to the potential of the neutral point of winding 12 and, therefore, also with respect to the potential of the cathode 24. The output voltage during the period considered is then the full line envelope of curves 16 to 21 as shown in Fig. 2 from which it appears that such envelope closely approximates the desired curve 78.

During the negative half cycle of the voltage of line 78 the several control electrodes of rectifier 43 are sequentially positively energized in a manner similar to that above described for the control electrodes of rectifier 23 thereby permitting anodes 36 to 41 to carry current at a voltage approximating the negative portion of curve 78. It will be understood that the operations of rectifiers 23 and 43 are really identical during their respective perods of energization but that the voltages delivered by rectifier 43 are shown as being negative because of the inverse connection of rectifiers 23 and 43 with line 78.

When current consuming devices connected with line 78 draw only current in phase with the voltage, the current wave of the converting system is then identical in shape with the voltage wave and each anode of the rectifiers carries current when such anode is positively energized by the associated transformer secondary winding portion. When reactive current is to be supplied to line 78, some of the anodes of the rectifiers continue to carry current in the manner previously described but the remainder of the anodes carry current while receiving negative potentials from the associated transformer winding portions. For example, if the current lags behind the voltage by 60 degrees, anodes 20 and 21, although made operable by the positive energization of control electrodes 30 and 31, will not carry any current, the flow of such current in rectifier 12 then beginning through anode 16 and continuing through anodes 17, 18, 19 and 20 as previously described. Such flow of current will then continue through anode 20 even though such anode receives a negative potential from the associated portion of winding 12 because cathode 24 is then at a more negative potential than anode 20 and anode 20 is therefore still positive with respect to cathode 24. During such period, anode 37 of rectifier 43 is also made operable by the positive energization of control electrode 47 but such anode does not carry current as it is then negative with respect to cathode 44. At a later instant control electrode 48 is positively energized so as to permit flow of current through the associated anode 38 and, assuming that anode 20 is still carrying current, a short circuit is established over anode 20, cathode 24, conductor 57, winding 13, anode 38, cathode 44, conductor 58, and winding 12, which short circuit includes portions of windings 12 and 13 energized at voltages which are additive in the circuit. To avoid such short circuit occurrence, control electrode 31 is energized simultaneously with control electrode 48 thereby causing transfer of the arc in rectifier 24 from anode 20 to anode 21. Anodes 21 and 38 being energized at voltages which neutralize each other in the short circuit established between the rectifiers, the operation of the system may continue without being disturbed by the flow of any short circuit current between the rectifiers. It will be understood that if the current lags behind the voltage in line 78 by a greater extent than above indicated, the remaining control electrodes of rectifier 24 must be energized simultaneously with the corresponding control electrodes of rectifier 43. Similarly, during the positive half cycle of the voltage of line 78 each control electrode of rectifier 43 must be energized simultaneously with the corresponding control electrode of rectifier 23. As already explained above such result is obtained by energizing each control electrode through a segment of a distributor having a brush making two revolutions during each cycle of the voltage of line 78.

In the embodiment illustrated in Fig. 3 the transformer secondary windings 12 and 13 are shown in a modified connection as indicated at 14 and 15. In the present embodiment conductors 57 and 58 are connected with taps of windings 14 and 15 which are preferably removed from the neutral point of the windings by substantially one-third of the turns of the tapped portions. In Fig. 3, however, two of the remaining phase portions of winding 14 are also connected with conductor 58 instead of being connected at the neutral point of the winding. Two of the phase portions of winding 15 are similarly connected with conductor 57. The operation of the system illustrated in Fig. 3 is similar to the operation of the system illustrated in Fig. 1 but, from a consideration of Fig. 4 it will be understood that the output voltage of the system approximates the sine wave represented by curve 78 much more closely than the voltage obtained from the embodiment illustrated in Fig. 1 and represented in Fig. 2. In the present embodiment distributors 63 and 64, which were not illustrated, are similar to the distributors of Fig. 1 but it will be understood that, in each of the embodiments shown, the dimensions of the segments of the distributors must be suitably so selected as to permit transfer of the arc from one anode to another in each rectifier at the time when such anodes have substantially equal voltages, such points being represented by the intersection of the respective voltage curves in Figs. 2 and 4.

In the embodiment illustrated in Fig. 5 it is assumed that the ratio of the frequencies of lines 10 and 78 is to be one to two so that if line 10 is energized at a frequency of fifty cycles per second the frequency of line 78 will be twenty-five cycles per second. In the present embodiment the several secondary winding portions of the input transformer are again wound with equal numbers of turns and are represented as at 34 and at 35. Winding 34 comprises six portions including four star connected portions, of which two are provided with taps to which the remaining two portions are connected. The taps provided in the two portions of winding 34 are preferably removed from the neutral point of the winding by a number of turns equal to substantially 40% of the number of turns of the wave tapped portions. Conductor 58 is connected with two of the portions of winding 34 through the windings of an auto-transformer 32 which may be wound on the same magnetic structure as the windings of the input transformer or which may be wound on a separate structure to form an individual unit. Winding 35 is connected similarly to winding 34 and is connected with conductor 57 through an auto-transformer 33. As will be understood from a consideration of Fig. 6, such connection permits energization of the anodes of the rectifiers at voltages having an envelope closely approximating a sine wave voltage of twenty-five cycle frequency. It will be understood, however, that, during the negative half cycle of the voltage of line 78, it is no longer possible to find anodes of rectifier 23 (not shown) having voltages equal and opposite to the voltages of the anodes of rectifier 43 (not shown) so that any attempt to permit the flow of reactive current through the system will result in a short circuit in the rectifiers. The present embodiment is therefore limited to the transmission of in phase current and for that purpose the control electrodes of the rectifiers are energized through the distributors 52 and 53 (not shown) having brushes 54 and 55 and driven by synchronous motors 68 and 69 operating to drive such brushes at the rate of only one revolution for each cycle of the voltage of line 78. As illustrated in Figs. 5 and 6 the control electrodes of rectifier 23 are positively energized only during the positive half cycle of the voltage of line 78 and the control electrodes of rectifier 43 are positively energized only during the negative half cycle of the voltage of line 78. Each of distributors 52 and 53 are therefore provided with an idle sector 52g or 53g which is not connected with any control electrodes. The operation of the present embodiment is entirely similar to that of the embodiment illustrated in Fig. 1 provided due consideration is given to the differences in the ratio of frequencies, such operation being further limited to the transmission of in phase current as explained above.

Although but a few embodiments of the present invention have been illustrated and described, it will be apparent to those skilled in the art that various changes and modifications may be made therein, such as suitable changes in the transformer winding connections or provision of additional elements duplicating elements herein shown for the purpose of providing systems operable at different frequency ratios or operable for converting polyphase alternating current of one frequency into polyphase alternating current of another frequency and at any desired number of phases, without departing from the spirit of the invention or from the scope of the appended claims.

It is claimed and desired to secured by Letters Patent:

1. In a system for transmitting electric energy between alternating current lines, an alternating current line of one frequency, a transformer connected with the said line, said transformer having secondary windings each divided into phase portions having equal numbers of turns connected to form a neutral point, a plurality of electron discharge devices connected with said transformer, each of said devices having anodes with associated control electrodes and a cathode, sources of potential of values different from the potential of the cathodes of said devices, means for sequentially applying a potential positive relative to the potential of the cathodes to the control electrodes of said devices from said sources, and an alternating current line connected with said devices and with the secondary windings of said transformer at points selected to compensate for harmonics of the frequency of the first said line introduced into the system by said transformer.

2. In a system for transmitting electric energy between alternating current lines, an alternating current line at one frequency, a transformer connected with the said line, said transformer having secondary windings each divided into phase portions having equal numbers of turns connected to form a neutral point, a plurality of electron discharge devices connected with said transformer, each of said devices having anodes with associated control electrodes and a cathode, sources of potential of values different from the potential of the cathodes of said devices, means for sequentially applying a potential positive relative to the potential of the cathodes to the control electrodes of said devices from said sources, and an alternating current line connected with said devices and with the secondary windings of said transformer at points other than the neutral points thereof to receive substantially sinusoidal potential therefrom of a frequency other than the fequency of the fist said line.

3. In a system for transmitting electric energy between alternating current lines, an alternating current line of one frequency, a transformer connected with said line and having a plurality of secondary windings each divided into phase portions with equal numbers of turns connected to form a neutral point, one of the phase portions of each of the secondary windings being tapped, a plurality of electron discharge devices connected with said transformer, each of said devices having anodes with associated control electroles, and a cathode, sources of potential of values different from the potential of the cathode of said devices, means for sequentially applying a potential positive relative to the potential of the cathodes to the control electrodes of said device from said sources, and an alternating current line having the conductors thereof severally connected with the taps of said transformer and with the cathodes of said devices.

4. In a system for transmitting electric energy between alternating current lines, an alternating current line of one frequency, a transformer connected with said line and having a plurality of secondary windings each divided into phase portions with equal numbers of turns, the major portion of the phases of the secondary windings being tapped, the remaining phases being connected with the taps, an auto-transformer interconnecting the said remaining phases, a plurality of electron discharge devices connected with said transformer, each of said devices having anodes with associated control electrodes and a cathode, sources of potential of values different from the potential of the cathodes of said devices, means for sequentially applying a potential relative to the potential of the cathodes to the control electrodes of said device from said sources, and an alternating current line having the conductors thereof severally connected with said auto-transformers and with the cathodes of said devices to receive potential therefrom at a frequency other than the frequency of the first said line.

5. In a system for transmitting electric energy between alternating current lines, an alternating current line of one frequency, a transformer connected with said line and having a plurality of secondary windings each divided into phase portions with equal numbers of turns, the major portion of the phases of the secondary windings being tapped, the remaining phases being connected with the taps, an auto-transformer interconnecting the said remaining phases of each of the said secondary windings, a plurality of electron discharge devices connected with said transformer, each of said devices having anodes with associated control electrodes and a cathode, sources of potential of values different from the potential of the cathodes of said devices, means for sequentially applying a potential positive relative to the potential of the cathodes to the control electrodes of said device from said sources, an alternating current line having the conductors thereof severally connected with said auto-transformers and with the cathodes of said devices to receive a substantially sinusoidal potential therefrom of a frequency other than the frequency of the first said line, and means for operating the first said means in synchronism with the frequency of one of said lines.

In testimony whereof, the signature of the inventor is affixed hereto.

HEINRICH MEYER-DELIUS.